United States Patent [19]

Melamed et al.

[11] Patent Number: 5,257,364
[45] Date of Patent: Oct. 26, 1993

[54] METHOD FOR GENERATING A CORRELATED SEQUENCE OF VARIATES WITH DESIRED MARGINAL DISTRIBUTION FOR TESTING A MODEL OF A COMMUNICATIONS SYSTEM

[75] Inventors: Benjamin Melamed, Warren; David Jagerman, Crawford, both of N.J.

[73] Assignee: NEC Research Institute, Inc., Princeton, N.J.

[21] Appl. No.: 581,522

[22] Filed: Sep. 12, 1990

[51] Int. Cl.$^5$ .................. G06F 15/31; G06F 15/336; G06F 15/48; G06F 7/58
[52] U.S. Cl. .................................. 395/500; 364/578; 364/436; 364/728.07; 364/728.02; 364/717; 364/194; 364/916.3; 364/221.2; 364/221.4; 364/222.4; 364/224.2; 364/224.21; 364/DIG. 1
[58] Field of Search ................ 395/500; 364/194, 578, 364/436, 717, 728.02, 728.07

[56] References Cited

U.S. PATENT DOCUMENTS 4,680,784  7/1987  Lehnert et al. ................. 379/11

FOREIGN PATENT DOCUMENTS 907554  2/1982  U.S.S.R. ..................... 364/728.07

OTHER PUBLICATIONS

Israel Korn; "A Simple Derivation of the Autocorrelation of a Random Pulse Train", Proceedings of the IEEE, Jun. 1970, pp. 955–956.

Primary Examiner—Robert B. Harrell
Assistant Examiner—Paul Harrity
Attorney, Agent, or Firm—Arthur J. Torsiglieri

[57] ABSTRACT

To provide a time series having correlated interarrival times for use in traffic and queueing studies, an independent identically distributed random number stream is first transformed to a sequence of correlated uniform variates by a special modulo-1 autoregressive operation and then further transformed into a sequence of correlated variates with a prescribed marginal distribution from which there is developed the desired time studies.

3 Claims, 1 Drawing Sheet

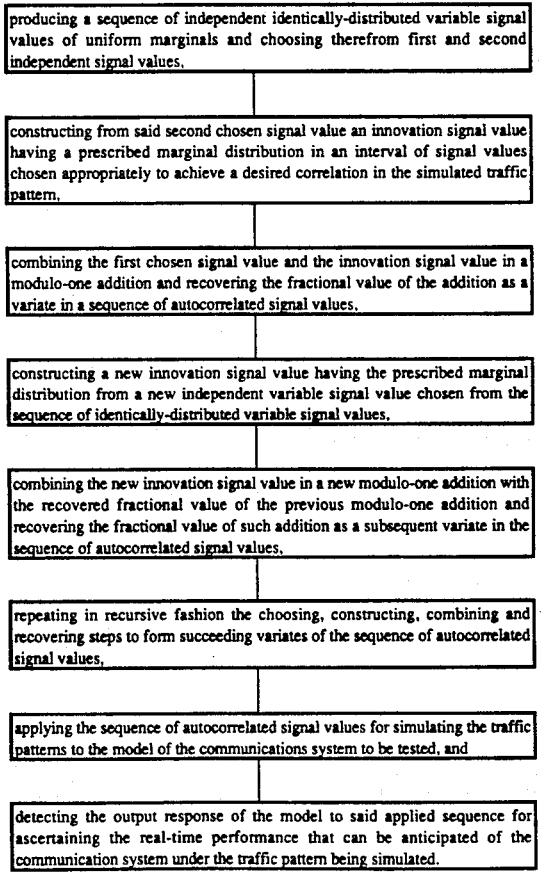

```
┌─────────────────────────────────────────────────────────────────┐
│ producing a sequence of independent identically-distributed     │
│ variable signal values of uniform marginals and choosing        │
│ therefrom first and second independent signal values,           │
└─────────────────────────────────────────────────────────────────┘
                                │
┌─────────────────────────────────────────────────────────────────┐
│ constructing from said second chosen signal value an innovation │
│ signal value having a prescribed marginal distribution in an    │
│ interval of signal values chosen appropriately to achieve a     │
│ desired correlation in the simulated traffic pattern,           │
└─────────────────────────────────────────────────────────────────┘
                                │
┌─────────────────────────────────────────────────────────────────┐
│ combining the first chosen signal value and the innovation      │
│ signal value in a modulo-one addition and recovering the        │
│ fractional value of the addition as a variate in a sequence     │
│ of autocorrelated signal values,                                │
└─────────────────────────────────────────────────────────────────┘
                                │
┌─────────────────────────────────────────────────────────────────┐
│ constructing a new innovation signal value having the           │
│ prescribed marginal distribution from a new independent         │
│ variable signal value chosen from the sequence of               │
│ identically-distributed variable signal values,                 │
└─────────────────────────────────────────────────────────────────┘
                                │
┌─────────────────────────────────────────────────────────────────┐
│ combining the new innovation signal value in a new modulo-one   │
│ addition with the recovered fractional value of the previous    │
│ modulo-one addition and recovering the fractional value of such │
│ addition as a subsequent variate in the sequence of             │
│ autocorrelated signal values,                                   │
└─────────────────────────────────────────────────────────────────┘
                                │
┌─────────────────────────────────────────────────────────────────┐
│ repeating in recursive fashion the choosing, constructing,      │
│ combining and recovering steps to form succeeding variates of   │
│ the sequence of autocorrelated signal values,                   │
└─────────────────────────────────────────────────────────────────┘
                                │
┌─────────────────────────────────────────────────────────────────┐
│ applying the sequence of autocorrelated signal values for       │
│ simulating the traffic patterns to the model of the             │
│ communications system to be tested, and                         │
└─────────────────────────────────────────────────────────────────┘
                                │
┌─────────────────────────────────────────────────────────────────┐
│ detecting the output response of the model to said applied      │
│ sequence for ascertaining the real-time performance that can    │
│ be anticipated of the communication system under the traffic    │
│ pattern being simulated.                                        │
└─────────────────────────────────────────────────────────────────┘
```

METHOD FOR GENERATING A CORRELATED SEQUENCE OF VARIATES WITH DESIRED MARGINAL DISTRIBUTION FOR TESTING A MODEL OF A COMMUNICATIONS SYSTEM

FIELD OF INVENTION

This invention relates to a process for generating a correlated sequence of variates, and more particularly to such generation for use in queueing systems for modelling traffic studies of communication systems.

BACKGROUND OF THE INVENTION

For traffic studies in communication systems, it has been fairly standard to use queueing models that assume that customer interarrival intervals and service times are independent, each being modelled as a renewal process. These standard models are easy to simulate and under suitable assumptions are even analytically tractable.

Unfortunately, they are very often poor models of real-life systems where correlations do exist, for example, bursty interval streams are typical examples of high correlation. Additionally, video signals include considerable correlation from line to line and frame to frame. In practice, there is a dramatic degradation of performance induced by increasing correlations. These correlations when suitably accounted for, can yield improved system design. In any event, it is advantageous to include known correlations when modeling real systems.

Typically, simulations have used a pseudo-random number generator to generate real sequences which model independent identically distributed (iid) uniform variates. Simulations for generating dependent sequences with specific correlations have received less attention.

A preferred generation method for dependent sequences of random variates should satisfy the following criteria:

a) Period: the generated sequence should have a reasonably long period; in particular, if the correlated sequence is generated by transforming an underlying random number sequence, then the period of the two sequences should be comparable.

b) Complexity: the time and space complexity required to implement the method on a computer should be reasonable functions of their counterparts in the underlying random number generator. Space complexity is rarely the issue, so one usually wants fast methods, especially when long sequences are required.

c) Coverage: the full range of theoretic correlations, that is $(-1, 1)$, should be attainable by a suitable adjustment of the method's parameters. Thus, if $\rho_{min}$ and $\rho_{max}$ are the extremal lag-1 autocorrelations, it is required that correlation in the range $(\rho_{min}, \rho_{max})$ be attainable. The endpoints are exempt since they may only be attained by degenerate methods.

d) Behavior: a method should generate a wide range of sample path behaviors as a function of its parameters.

The autocorrelation structure $\rho_n$ of a real random stationary sequence $\{X_n\}$ with finite second moment, is a measure of (linear) dependence captured by the sequence $$\rho_n = \frac{E[X_0 X_n] - \mu_x^2}{\sigma_x^2}, n = 1, 2, \ldots$$

of the lag-n correlation coefficients, where $X_n$ are the random variables, and where $\mu_x$ is the common mean and $\sigma_x^2$ is the common variance of the $X_n$.

Various methods that have been used hitherto to generate correlated variates with uniform marginals can be broadly classified into three approaches (the goal is always to generate a stationary sequence $\{X_n\}$ with a marginal distribution function F).

Approach 1: Generate $X_0 \sim F$ and then continue recursively, generating $X_{n+1}$ from $X_n$ through some autoregressive scheme which is closed under F (i.e., preserves F). This approach is the most popular one. It enjoys the advantage that the attendant autocorrelation function is typically very easy to derive. On the other hand, this approach is ad hoc in the sense that one needs to devise a separate autoregressive scheme for each F. For some families of distributions, finding the appropriate autoregressive scheme can be quite daunting.

Approach 2: Fix a tractable marginal distribution F* (normal is a typical choice), and generate the corresponding sequence $\{X_n^*\}$, with an autoregressive scheme closed under F*. Then, the sequence $\{F^*(X_n^*)\}$ is uniform and the target sequence $\{X_n\}$ is obtained via the inversion method, i.e., $X_n = F^{-1}(F^*(X_n^*))$. Here the autocorrelation structure has been transformed twice: once by F* and once by $F^{-1}$. Nevertheless, the autocorrelation function of $\{X_n^*\}$ can be computed in principle, though numerical difficulties could be presented by certain F. This approach is more general than the previous one, but it shifts the difficulties to the numerical calculation of the transformed autocorrelation structure.

Approach 3: This is a special case of the previous approach when F* is already chosen to be uniform, thereby obviating the first transformation in Approach 2. Nevertheless, the major simplication brought about by this choice of F* merits viewing it as a separate approach.

For our novel technique, we shall follow Approach 3, and so we henceforth focus on generation methods for correlated uniform sequences $\{U_n\}$ and on their autocorrelation structure.

A general though unspecific procedure to generate a c.i.d. (correlated identically distributed) sequence of random variables $\{X_n\}$ is to take an i.i.d. (independent identically distributed) Uniform (0,1) sequence $\{Z_n\}$ (generated approximately on a computer via a pseudo-random number generator), and transform it into a correlated uniform sequence $\{U_n\}$. If a correlated sequence with another (non-uniform) marginal distribution is desired, the sequence $\{U_n\}$ may be further transformed, say by transformations $D_n$, yielding the target sequence $\{X_n\}$, where $X_n = D_n(U_n)$. For historical reasons the $D_n$ shall be referred herein as distortions. Typically, $D_n$ will implement an inversion method; that is $D_n = F_n^{-1}$ where $F_n$ is the distribution function of the $X_n$. To keep notation simple, we shall henceforth deal with stationary sequences with a common distortion D. Note, however, that D transforms the autocovariance structure, i.e., it maps the autocovariance function of $\{U_n\}$ $$\Psi_U(\tau) = Cov[U_0, U_\tau] = E[U_0 U_\tau - \tfrac{1}{4}], \tau = 0, 1, \quad (1.1)$$

to the autocovariance function of $\{X_n\}$ $$\Psi_X(\tau) = \text{Cov}[X_0, X_\tau] = E[D(U_0)D(U_\tau)] - \mu_X^2, \tau = 0, 1, \quad (1.2)$$

where $\mu_X$ is the common mean of the $X_n$. In particular, $\Psi_X(0) = \sigma_X^2$ where $\sigma_X^2$ is the common variance of the $X_n$ (assumed finite throughout the discussion).

In practice, constraints on a correlated sequence are stated in terms of the target sequence $\{X_n\}$. These requirements will usually include the form of the marginal distribution of $\{X_n\}$ as well as the first few autocorrelations. The need is to devise an auxiliary uniform sequence $\{U_n\}$ and implement it on a computer such that transforming each $U_n$ to $X_n$ via D would comply with the prescribed constraints on $\{X_n\}$. The term "controlling the autocorrelations" refers to an ability to satisfy autocovariance constraints. Thus, one way to control autocorrelations is to devise generation methods of uniform sequences $\{U_n\}$, derive their autocovariance function (1.1), and then proceed to find the mapping $\Psi_U \to \Psi_X$ (induced by D) and its inverse mapping $\Psi_X \to \Psi_U$.

The literature contains considerable work on generating target sequences $\{X_n\}$ directly. Such methods are tailored to a specific target distribution and have easily derived autocorrelation functions. However, they may require more than one transformation to conveniently generate arbitrary marginals (the first transformation being the distribution function and yielding a uniform variate). Since one usually needs to follow the uniform distribution route, working with uniform sequences is much desired. The generation problem of correlated uniform sequences $\{U_n\}$ was addressed by a number of workers in the prior art. For example, workers have proposed minification (moving minimum) and maxification (moving maximum) processes. The present invention employs a new method for generating Markovian sequences of random variables with uniform marginals.

SUMMARY OF THE INVENTION

In particular, a feature of the present invention is a novel method for generating sequences of random variables with uniform marginals, to be described as "Transform-Expand-Sample" (TES). This method, to be described in more detail subsequently, uses as inputs an independent identically distributed random number stream of uniform marginals and a pair of specified control parameters, and subjects such inputs to a modulo 1 autoregressive scheme that yields a sequence of correlated variates with a uniform marginal distribution.

Often, when the sequence of variates is to be used in the modelling of traffic studies with varying characteristics, it is advantageous that the sequence have a prescribed marginal distribution. In this case, by an additional computer transformation on each TES-generated variate in the uniform marginal distributions, there can be formed a correlated sequence with a wide range of marginal distributions.

More specifically, a random number generator is used to produce a sequence of independent identically distributed variates from which one is chosen to serve as the initial variate or seed in a modulo one autoregressive operation. To it is added as a second component in such operation, an innovation variate that is constructed from another independent identically-distributed variate, which may be a succeeding variate in the sequence. In particular, the innovation variate is constructed to have a desired probability distribution in an interval chosen appropriately to introduce the desired autocorrelation. The fractional part of the sum of the addition serves both as the first variate of the desired output sequence and as one element of a subsequent modulo one addition operation including a new innovation variate constructed in the manner of the first innovation variate. This process is repeated recursively to derived the desired sequence of correlated variates with a uniform probability distribution.

Moreover, to widen the range of autocorrelation functions available, a modified version of the just-discussed process is available in which the produced sequence of variates is used to form a modified sequence in which the even-numbered variates in the sequence retain their original value but the odd-numbered variates are replaced by variates whose value is one minus their value in the original sequence.

When a desired non-uniform marginal probability distribution is desired, this derived sequence can be further modified to achieve the desired marginal probability distribution by use of standard distortion techniques.

In practice, for given traffic data with a characteristic autocorrelation function, one would proceed to generate a TES sequence that approximates the data marginal distribution and its autocorrelation function, and then use such a sequence in a Monte Carlo simulation. The modelling task of finding an appropriate TES model for the given traffic data is made easier by the availability of fast numerical methods for calculating TES autocorrelation functions.

BRIEF DESCRIPTION OF THE DRAWING

The single FIGURE of the drawing is a flow chart of the basic operations of the process of the invention for use in traffic studies.

DETAILED DESCRIPTION OF THE INVENTION

There is a natural affinity between Uniform (0,1) sequences and modulo-1 arithmetic. In fact, uniformity is closed under modulo-1 addition in a rather general way to be made precise later. This fact motivates the consideration of modular processes, defined here as processes obtained by applying modulo arithmetic as the final operation. It turns out that one can define very simple modular processes leading to tractable $\Psi_u$ and $\Psi_x$, yet possessing interesting and varied sample path behavior, as well as favorable coverage and period properties.

The basis for our novel approach is provided by a simple fact, (Lemma 1 below) establishing that uniformity is closed under modulo-1 addition.

Let $[x] = \max\{\text{integer } n : n \leq x\}$ be the integral part of x, (x real) and let $\{x\} = x - [x]$ be the fractional part of x. Note that $\{x\} \geq 0$ for all real x and that bold brackets and braces are used to denote the integral part and fractional part operators, so as to distinguish them from their syntactic counterparts.

Lemma 1 (General Iterated Uniformity)

Let $U \sim \text{Uniform}(0,1)$ and $X = \{U+V\}$ where V is independent of U but has an arbitrary distribution. Then it can be shown that $X \sim \text{Uniform}(0,1)$.

Based on this, we have devised a class of simple modular processes with uniform marginals. The algorithmic construction will be called a TES (Transform-Expand-Sample) method. Specifically, we shall be interested in two related classes of TES methods called TES+ and TES−, giving rise to modular processes $\{U_n^+\}_{n=0}^\infty$ and $\{U_n^-\}_{n=0}^\infty$ respectively. These sequences (called TES sequences) are defined recursively over a common probability space by $$U_n^+ = \begin{cases} U_0, & n = 0 \\ \{U_{n-1}^+ + V_n\}, & n > 0 \end{cases} \quad (1.3)$$

$$U_n^- = \begin{cases} U_n^+, & n \text{ even} \\ 1 - U_n^+, & n \text{ odd} \end{cases} \quad (1.4)$$

where $U_0^+ = U_0^- = U_0 \sim \text{Uniform}(0,1)$, and $\{V_n\}_{n=0}^\infty$ is a stationary innovation sequence, i.e., a sequence of i.i.d variates where each $V_n$ (the innovation variate) is independent of the histories $\{U_0^+, \ldots, U_{n-1}^+\}$ and $\{U_0^-, \ldots, U_{n-1}^-\}$ and can have a uniform probability distribution or any other desired probability distribution. The reason for the introduction of TES− is the need to provide coverage of the entire correlation coefficient range for marginally uniform sequences: TES+ methods (appropriately parameterized) realize all values of the first autocorrelation in the range [0,1], while their TES− counterparts cover the range [−1,0]. In a similar vein, distorted TES sequences will cover realizable positive and negative ranges of their first autocorrelation.

From now on and without further mention, we shall consistently append the proper superscript (plus or minus) to distinguish between similar mathematical objects associated with TES+ and TES−, respectively. For example, $\rho_U^+(n)$ and $\rho_U^-(n)$ will denote the autocorrelation coefficient functions of $\{U_n^+\}$ and $\{U_n^-\}$, respectively. The more precise equivalent notation $\rho_{U_+}(n)$ and $\rho_{U_-}(n)$ is more cumbersome and will not be used. Objects common to $\{U_n^+\}$ and $\{U_n^-\}$, or those for which the distinction is not important, will carry no superscript. For example, if $\{X_n^+\}$ and $\{X_n^-\}$ are the stationary distorted sequences given by $X_n^+ = D(U_n^+)$ and $X_n^- = D(U_n^-)$, then $\mu_X$ and $\sigma_X^2$ will denote their common mean and common variance, in notational agreement with (1.2).

Using simple properties of modulo 1 addition, we can equivalently represent (1.3) as $$U_n^+ = \{U_0 + S_n\}, n \geq 0 \quad (1.5)$$

where $$S_n = \sum_{j=1}^n V_j, n \geq 0 \quad (1.6)$$

is the sum of n i.i.d. variates ($S_0 = 0$). From (1.4), the analogous representation of $U_n^-$ is $$U_n^- = \begin{cases} \{U_0 + S_n\}, & n \text{ even} \\ \{1 - U_0 - S_n\}, & n \text{ odd} \end{cases} \quad (1.7)$$

Letting f(x) be the common density function of the innovations $V_n$ and denoting by $f_n(x)$ the density function of $S_n$, it is clear that $f_n(x)$ is the n-fold convolution of f. We denote by $f_0$ the Dirac function $\delta(x)$ which constitutes the identify under convolution. Throughout this paper we shall consistently append a tilde to a function symbol h(x) to denote its Laplace transform $$\tilde{h}(s) = \int_{-\infty}^\infty e^{-sx} h(x) dx$$

With this notation, the convolutions $f_n(x)$ imply the transform relations $$\tilde{f}_n(s) = [\tilde{f}(s)]^n, n = 1, 2, \quad (1.8)$$

The sample path relationship of Eq. (1.4) between $\{U_n^+\}$ and $\{U_n^-\}$ will reduce the amount of work needed to analyze the latter, by deducing many of its properties from the former. For example, Eq. (1.4) implies that
$\{U_n^-\}_{n=0}^\infty = \{U_0, 1-U_1^+, U_2^+, 1-U_3^+, \ldots\}$ leading immediately to the important simple relations $$\rho_U^-(\tau) = (-1)^\tau \rho_U^+(\tau), \tau = 0, 1, \quad (1.9)$$

$$\Psi_U^-(\tau) = (-1)^\tau \Psi_U^+(\tau), \tau = 0, 1, \quad (1.10)$$

As mentioned before, although Lemma 1 allows the innovations $\{V_n\}$ to have any distribution, it is clear that computational and analytical considerations will steer us to "simple" innovations. I shall focus mostly on $$V_n \sim \text{Uniform}(-L, R), n = 1, 2, \quad (1.11)$$

where the pairs (L,R) satisfy $0 \leq L$, $R \leq 1$, $L + R \leq 1$. Since each pair (L,R) completely specifies a TES method, we shall denote by TES+(L,R) and TES−(L,R) the corresponding algorithmic construction of the resultant $\{U_n^+\}$ and $\{U_n^-\}$ respectively. In the sequel, we shall often find it convenient to switch from the (L,R) parameterization of TES methods to the equivalent parameterization $(\alpha, \phi)$ given by $$\alpha = L + R \quad (1.12)$$

$$\phi = \begin{cases} \dfrac{R - L}{\alpha}, & \alpha > 0 \\ 0, & \alpha = 0 \end{cases} \quad (1.13)$$

In this case we write TES+$(\alpha, \phi)$ and TES−$(\alpha, \phi)$.

The simplicity of $\{V_n\}_{n=0}^\infty$ in (1.11) is evident from the fact that it can be easily constructed as a linear transformation of an i.i.d. Uniform(0,1) sequence $\{Z_n\}_{n=1}^\infty$. We identify $\{Z_n\}$ with the values of a pseudo random number stream. Specifically, $$V_n = -L + \alpha Z_n, n = 1, 2, \quad (1.14)$$

so the Laplace transforms $\tilde{f}_n(S)$ for the sums $S_n$ in (1.6) become $$\tilde{f}_n(s) = \left[\frac{e^{sL} - e^{-sR}}{s\alpha}\right]^n, n = 0, 1, \ldots \quad (1.15)$$

or equivalently, under the $(\alpha, \phi)$ parameterization $$\tilde{f}_n(s) = \left[\frac{e^{\frac{s\alpha(1-\phi)}{2}} - e^{\frac{-s\alpha(1+\phi)}{2}}}{s\alpha}\right]^n, n = 0, 1, \ldots \quad (1.16)$$

We remark again that the special choices in (1.14) and (1.15) will be assumed only for practical calculations and only where explicitly stated.

TES methods have a simple geometric interpretation as random walks on the unit circle. For example, $TES^+(L,R)$ constructs $U_{n+1}^+$ from $U_n^+$ by forming a "circular interval" (arc) around $U_n^+$ of length L to its "left" and length R to its "right" and then samples uniformly for $U_{n+1}^+$ in this arc. The $TES^-(L,R)$ construction is similar except that the arc is constructed about $1-U_n^-$. In the alternative parameterization ($\alpha$, $\phi$) of (1.12)–(1.13), $\alpha$ is the total length of the arc whereas $\phi$ is a measure of the offset of the arc from symmetric straddle. Symmetric straddle corresponds to $\phi=0$ (i.e., R=L), so in $TES^+(\alpha, 0)$ the variate $U_{n+1}^+$ is generated with equal probability $\frac{1}{2}$ to the left or to the right of $U_n^+$, and the sequence $\{U_n^+\}$ has zero net drift around the unit circle. For $\phi>0$ (i.e., R>L), $U_{n+1}^+$ is more likely to lie to the right of $U_n^+$ than to its left, and the sequence $\{U_n^+\}$ has a net clockwise drift around the unit circle. The case $\phi<0$, will analogously produce a net counter-clockwise drift.

TES methods enjoy the following properties.

a) A TES method presupposes the availability of a standard i.i.d. uniform random number stream $\{W_n\}$. However, its simplicity makes it suitable for computer generation, and the complexity of generating the correlated sequence $\{U_n\}$, equals that of generating $\{W_n\}$ plus a small constant. Furthermore, its geometrical interpretation (to be discussed later) shows that the period of $\{U_n\}$ is at least as long as that of $\{W_n\}$.

b) For any prescribed $-1 \leq r \leq 1$, there is a TES method with $Corr[U_n, U_{n+1}]=r$, $n \geq 1$. Furthermore, TES methods give rise to autocorrelation functions $\rho_n$ whose magnitude in n is both monotonic (for $\phi=0$) and oscillatory (for $\phi \neq 0$); in this sense, TES methods improve on the minification/maxification methods whose resultant autocorrelation functions are strictly monotonic.

c) While a basic TES method generates a stationary process with uniform marginals, it can be easily modified to generate non-stationary uniform sequences $\{U_n\}$ with arbitrary step dependent correlations $r_n = Corr[U_n, U_{n+1}]$. In fact, the $r_n$ could be modulated by time or by some other stochastic mechanism.

d) TES methods are particularly suitable for simulating random cyclic phenomena. Random resets occur when the point 0 is crossed in either direction.

A more detailed discussion of TES follows.

This discussion will be organized as follows. First, there is presented notational conventions and other preliminaries. TES methods are formally introduced next. Then, we compute and investigate analytically the first autocorrelation of TES generated uniform sequences, whereas higher lag autocorrelations are investigated empirically by simulation. Finally, we touch on model fitting issues with TES sequences. The autocorrelation function of TES sequences and their transformations (via the inversion method) can be derived through Fourier methods; numerical calculations of autocorrelation functions of TES sequences were found to be in excellent agreement with their simulation counterparts including those to be discussed. This shows that TES induced autocorrelation functions can be computed numerically from convergent series representations.

In the following discussion, the following notation is used. The indicator function of a set A is denoted $1_A(\cdot)$; however, when A is an event, we usually omit the (sample point) argument. If x is a real number, then $[x]$ denotes its integral part and $\{x\}$ its fractional part (equivalently its value modulo 1); notice the bold type used to distinguish the bracket and brace operators from their ordinary syntactic meaning. Specifically, $[x] = \sup \{\text{integer } n: n \leq x\}$ $\{x\} = x - [x]$ so $\{x\}$ is always non-negative (even for negative x).

It is convenient to view the interval $[0,1)$ as a circle, obtained by joining the points 0 and 1 together, say, at the bottom of the circle. The topology of the circular unit interval provides a convenient geometric model for the wraparound effect of modulo 1 arithmetic. To see that, observe that for any two points x, y $\in [0,1)$ there are two distance-like functions $$d_l(x,y) = \{x-y\} \text{ (left-distance)} \quad (2.1)$$

$$d_r(x,y) = \{y-x\} \text{ (right-distance)} \quad (2.2)$$

We note in passing the relation $d_l(x,y) = d_r(y,x)$, which for $x \neq y$ is also a direct consequence of the identity $$\{x\} + \{-x\} = 1, \; x \in (0,1). \quad (2.3)$$

Neither $d_l(\cdot)$ nor $d_r(\cdot)$ is a metric since they are not symmetric. However, a metric $d_c$ can be defined on $[0,1)$ in a natural way by $$d_c(x,y) = \min(d_l(x,y), d_r(x,y)). \quad (2.4)$$

We shall refer to $d_c$ as the circular distance on $[0,1)$. It is also useful to define relations $\leq_c$ and $<_c$ on $[0,1)$ (called the circular positioning relation and strict circular positioning relation) by $$x \leq_c y \text{ iff } d_c(x,y) = d_l(x,y) \text{ iff } d_c(x,y) = d_r(y,x) \quad (2.5)$$

$$x <_c y \text{ iff } x \leq_c y \text{ and } x \neq y \quad (2.6)$$

where the left-hand side of (2.5) reads "x is to the left of y" (equivalently, "y is to the right of x"), and similarly for (2.6). While every two points in $[0,1)$ are comparable under the circular positioning relation, it does not constitute a total ordering due to the absence of transitivity. Nevertheless, it does provide a sense of local directionality compatible with the usual geometric interpretation of clockwise rotation as movement to the right and counter-clockwise rotation as movement to the left. Furthermore, crossing point 0 in either direction represents the modulo 1 operation, or more pictorially, wraparound action. A wraparound interval $[a,b)$ on the circular unit interval with endpoints a and b in $[0,1)$, $a \neq b$, is $$[a, b) = \{x \in [0, 1): d_r(a, x) < d_r(a, b)\} =$$

$$\begin{cases} [a, b), & \text{if } a \leq b \\ [0, 1) - [a, b), & \text{if } a > b \end{cases}$$

where bold brackets and parentheses are used to distinguish wraparound intervals from ordinary ones. In words, $[a,b)$ consists of all points on the circular unit interval from a and clockwise to b (including a but excluding b), possibly wrapping across point O. It is convenient to define $[0,1) = [0,1)$ and somewhat inconsistently $[a,a) = \{a\}$ (singleton set). The definition of other circular intervals with open/closed endpoints is similar.

We begin with a general description of TES (Transform-Expand-Sample) methods. Subsequently, we progressively specialize to TES methods of particular interest. A general TES method operates within the following mathematical setup. Let, $\theta:[0,1) \to [0,1)$ be a bijection (1—1 and onto mapping), $\delta:[0,1) \to 2^{[0,1)}$ be a set-valued function from $[0,1)$ to subsets of $[0,1)$.

Denote, $D_y = \delta(y)$ $C_x = \{y \epsilon [0,1): x \epsilon D_y\}$.

Thus, $C_x$ is the set of all $y \epsilon [0,1)$ such that $D_y$ "covers" the prescribed $x \epsilon [0,1)$. Letting $\lambda(\cdot)$ denote the Lebesgue measure on $[0,1]$ we make a number of mild regularity assumptions (all measurability statements are with respect to the Lebesgue measure):

3.a) $\theta(\cdot)$ is measurable.
3.b) $D_y$ is measurable for almost every y.
3.c) $C_x$ is measurable for almost every x.

Definition 1: A general TES method iterates a three step loop to generate $U_{n=1}$ given $\theta(\cdot)$, $\delta(\cdot)$ and $U_n = y$:

Step 1: Transform $y \to \theta(y)$.
Step 2: Expand $\theta(y) \to D_{\theta(y)} = \delta(\theta(y))$.
Step 3: Sample uniformly in $D_{\theta(y)}$ to obtain $U_{n+1}$, so that the conditional density of $U_{n+1}$ given $U_0, \ldots, U_n$ depends only on $U_n$ via the set $D_{\theta(U_n)}$, viz.

$$\frac{d}{dx} P\{U_{n+1} \leq x | U_n, U_{n-1}, \ldots, U_0\} = \frac{1_{D_{\theta(U_n)}}(x)}{\lambda(D_{\theta(U_n)})}, x \epsilon [0, 1).$$

Our interest in TES methods is motivated by the previously mentioned Lemma of Iterated Uniformity, now discussed in more detail.

Let $U \sim \text{Uniform}(0,1)$ and let V be obtained by applying a TES method as in Definition 1. Suppose further, that for some $\alpha \epsilon (0,1)$ we have:

a) $\lambda(D_y) \equiv \alpha$ for almost every $y \epsilon [0,1)$.
b) $\lambda(C_x) \equiv \alpha$ for almost every $x \epsilon [0,1)$.

Then $V \sim \text{Uniform}(0,1)$.

Proof: Directly from the construction, V has a conditional density (given U), $$f_{V|U}(x|y) = \frac{1}{\alpha} 1_{D_{\theta(y)}}(x), x \epsilon [0, 1). \quad (3.1)$$

Therefore, the (unconditional) density of V is $$f_V(x) = \int_0^1 \frac{1}{\alpha} 1_{D_{\theta(y)}}(x) dy = \frac{1}{\alpha} \lambda(C_x) = 1$$

as required.

The reason for the term "Iterated Uniformity", is motivated by the following.

Corollary 1: The sequence $\{U_n\}_{n=0}^\infty$ (obtained by the iterative application of a TES method on an initial $U_0 \sim \text{Uniform}(0,1)$) is stationary with Uniform[0,1) marginals. Furthermore, it forms a Markov Process (discrete parameter, continuous state) with transition density given by (3.1), which is also the joint density of each pair $(U_n, U_{n+1})$.

Lemma 1 can be generalized, by dropping conditions a) and b) provided we still have $$\int_0^1 \frac{1}{\lambda(D_{\theta(y)})} 1_{D_{\theta(y)}}(x) dy = 1. \quad (3.2)$$

The problem is then to find suitable $\theta(\cdot)$ and $\delta(\cdot)$ such that the attendant $D_{\theta(y)}$ still satisfies (3.2).

We now proceed to specialize TES to an important subclass characterized by sets $D_y$ of the wraparound interval type. We, henceforth, focus on TES methods determined by triples TES($\theta$, L, R) where a) $\theta(\cdot)$ is a measurable bijection as before.
b) L, R $\epsilon [0,1]$ are constants such that $L + R = \alpha \epsilon [0,1]$.

The sets $D_{\theta(y)}$ are constructed as $D_{\theta(y)} = [\{\theta(y) - L\}, \{\theta(y) + R\}]$, i.e., as wraparound intervals of, respectively, length L to the left and length R to the right of $\theta(y)$, yielding a wraparound interval $D_{\theta(y)}$ of total length $\alpha$. Note that as long as $\theta(y) - L \geq 0$ and $\theta(y) + R \leq 1$, the set $D_{\theta(y)}$ forms one contiguous interval in the linear view of $[0,1)$; if either $\theta(y) - L < 0$ or $\theta(y) + R > 1$, wraparound will yield a $D_{\theta(y)}$ which is the union of two possibly non-contiguous intervals anchored at the points 1 and 0 respectively. In the circular view of $[0,1)$, the set $D_{\theta(y)}$ always forms a contiguous interval.

It is convenient to interchange the L and R parameters with an equivalent parameter $\phi$ defined as $$\phi = \frac{R - L}{\alpha} \quad (3.3)$$

Recalling that, $$\alpha = R + L, \quad (3.4)$$

the equivalence of $(\alpha, \phi)$ and $(L,R)$ follows immediately from (3.3) and (3.4) justifying the interchangeable notation TES($\theta$,L,R) or TES($\theta,\alpha,\phi$). Observe that $\phi$ is a measure of how $\theta(y)$ is offset from the center of the interval $D_{\theta(y)}$ (alternatively, $\phi$ measures how $D_{\theta(y)}$ is rotated relative to the inverval straddling $\theta(y)$ symmetrically). Strictly speaking, the use of $\phi$ as a structural parameter characterizing a TES method is redundant, since $\phi$ can be absorbed in $\theta(\cdot)$. However, it can be justified as a matter of convenience since it simplifies the explanation of the qualitative dynamics of the random walk $\{U_n\}$. To see that, observe that $\phi$ can be represented as $$\phi = q - p \text{ where } q = \frac{R}{\alpha}, p = \frac{L}{\alpha} \quad (3.5)$$

Thus, p and q are the probabilities of sampling $U_{n+1}$ to the left and to the right of $\theta(U_n)$, respectively. Their difference $\phi$ then represents the drift (or "velocity") of $\{U_n\}$ as it meanders around the circular unit interval. Positive $\phi$ correspond to positive velocity (right or clockwise drift) while negative $\phi$ correspond to negative velocity (left or counter-clockwise drift). The interpretation for $\phi = 0$ is obvious. The extremal cases $\phi = \pm 1$ correspond to maximal velocities ($\phi$ as defined in (3.3) is standardized by division by $\alpha$).

In the remainder of the discussion we focus on two fundamental mappings $\theta$ denoted $\theta^+$ and $\theta^-$ and defined by $$\theta^+(y) = y \quad \text{(identity)} \tag{3.6}$$

$$\theta^-(y) = 1 - y \quad \text{(reflection)} \tag{3.7}$$

Definition 2: $TES^+(L,R)$ (or $TES^+(\alpha,\phi)$) is the TES method $TES(\phi^+, L, R)$ giving rise to a sequence $U^+ = \{U_n^+\}$ defined recursively as follows:

a) $U_0^+ = U_0 \sim \text{Uniform}(0,1)$.

b) Given $U_n^+$, the next iterate $U_{n+1}^+$ is sampled uniformly on $$D_{U_n+} = \mathbb{C}\{U_n^+ - L\}, \{U_n^+ + R\},$$

i.e., $$f_{U_{n+1}^+|U_n^+}(x) = \begin{cases} \frac{1}{\alpha}, & x \in D_{U_n+} \\ 0, & \text{otherwise} \end{cases}$$

Definition 3: $TES^-(L,R)$ (or $TES^-(\alpha,\phi)$) consists of alternating TES methods $TES(\theta^-, L, R)$ and $TES(\theta^-, R, L)$ giving rise to $U^- = \{U_n^-\}$ defined recursively as follows:

a) $U_0^- = U_0 \sim \text{Uniform}(0,1)$.

b) Given $U_n^-$, the next iterate $U_{n+1}^-$ is sampled uniformly on $$D_{U_n-} = \begin{cases} \mathbb{C}\{1 - U_n^- - L\}, \{1 - U_n^- + R\}, & n \text{ even} \\ \mathbb{C}\{1 - U_n^- - R\}, \{1 - U_n^- + L\}, & n \text{ odd} \end{cases}$$

i.e., $$f_{U_{n+1}^-|U_n^-}(x) = \begin{cases} \frac{1}{\alpha}, & x \in D_{U_n-} \\ 0, & \text{otherwise} \end{cases}$$

The attendant correlation coefficients of lag n are similarly denoted ($n > 0$)

$$\text{Corr}[U_0^+, U_n^+] = \rho_n^+$$

$$\text{Corr}[U_0^-, U_n^-] = \rho_n^-$$

For $n = 1$ we simply write $\rho^+$ and $\rho^-$, omitting the subscript.

The reason for emphasizing the $TES^+$ and $TES^-$ methods is that together they generate every lag $-1$ correlation; in fact, we show later that the correlation coefficients $\rho^+(\alpha,\phi)$ and $\rho^-(\alpha,\phi)$ as a function of $\alpha$ and $\phi$ map $(\alpha,\phi) \in [0,1] \times [-1,1]$ onto the intervals $[0,1]$ and $[-1,0]$, respectively. First we establish that these are indeed TES methods giving rise to uniform marginals.

Proposition 1: $TES^+$ and $TES^-$ are TES methods satisfying Lemma 1.

Proof: Both $\theta^+$ and $\theta^-$ are obviously Lebesgue measurable. Since $D_{\theta^+(y)}$ and $D_{\theta^-(y)}$ are unions of at most two intervals, they are clearly measurable. Directly from definition, they have Lebesque measure $\alpha$. Finally for $TES^+$, $C_x^+ = \mathbb{C}\{x - R\}, \{x + L\}$; and for $TES^-$, $C_x^- = \mathbb{C}\{-x - A\}, \{-x + B\}$, where $A = R$ and $B = L$ on odd iterates, whereas $A = L$ and $B = R$ on even iterates. Since both $C_x^+$ and $C_x^-$ are wraparound intervals, they are measurable. Each has Lebesgue measure $\alpha$ because they can be represented as translations of the intervals $D_{\theta^+(x)}$ and $D_{\theta^-(x)}$, on the circular unit interval.

The proof of the last part of Proposition 1 becomes trivial when considering the geometrical interpretation of wraparound as described in Section 2. It is then easy to see that the wraparound intervals $C_x^+$ and $C_x^-$ are (rigid) translations of the basic interval $[0,\alpha)$.

Now we calculate the lag-1 autocorrelation of $TES^+$ and $TES^-$. We begin by showing that it is enough to investigate $TES^+$ since the relation between $\{U_n^+\}$ (induced by $TES^+$) and $\{U_n^{31}\}$ (induced by $TES^-$) is antithetic in the following sense.

Proposition 2: There is a construction of $\{U_n^+\}$ and $\{U_n^-\}$ over a common probability space such that $$U_n^- = \begin{cases} U_n^+, & n \text{ even} \\ 1 - U_n^+, & n \text{ odd} \end{cases}$$

Proof: It is enough to prove for $n = 0, 1, 2$ as the rest follows by simple induction.

For $n = 0$, $U_0^- = U_0^+ = U_0$ by definition.

For $n = 1$, let $W_1 \sim \text{Uniform}(0,\alpha)$ be independent of $U_0$. Directly, from definition, $$U_1^+ = \{U_0 - L + W_1\}.$$

Define $W_1' = \alpha - W_1$; then $W_1' \sim \text{Uniform}(0,\alpha)$ independent of $U_0$. Furthermore, with probability 1, $$U_1^- = \{1 - U_0 - R + W_1'\} = \{-U_0 - (\alpha - L) + \alpha - W_1\}$$

$$= \{-U_0 + L - W_1\} = 1 - \{U_0 - L + W_1\} = 1 - U_1^+.$$

Finally, for $n = 2$, let $W_2 \sim \text{Uniform}(0,\alpha)$ be independent of $U_0$, $U_1$ and $W_1$, Then, $$U_2^- = \{U_1^+ - L + W_2\} = U_2^+,$$

as required.

Corollary 2: $\rho_n^- = (-1)^n \rho_n^+$, $n = 1, 2, \ldots$, since by Proposition 2

$$(U_0^-, U_n^-) = \begin{cases} (U_0^+, U_n^+), & n \text{ even} \\ (U_0^+, 1 - U_n^+), & n \text{ odd} \end{cases}$$

Corollary 3: It is straightforward to conclude from Proposition 2 the representations $$U_n^+ = \{U_0 - nL + \sum_{i=1}^{n} W_i\}, \quad n = 0, 1, \ldots$$

$$U_n^- = \{(-1)^n \left(U_0 - nL + \sum_{i=1}^{n} W_i\right)\}, \quad n = 0, 1, \ldots$$

where $U_0 \sim \text{Uniform}(0,1)$ and the $W_i \sim \text{Uniform}(0,\alpha)$ are i.i.d. and independent of $U_j$, $0 \leq j \leq i$.

We now proceed to derive the lag-1 autocorrelation $\rho^+$.

Theorem 1: Let $\{U_n^+\}$ be generated by $TES^+(\alpha,\phi)$. Then, $$\rho_1{}^+ = \rho^+(\alpha, \phi) = 1 - \frac{3 + 3\phi^2}{2}\alpha + \frac{1 + 3\phi^2}{2}\alpha^2, \quad (4.1)$$

$$\alpha \epsilon [0, 1], \phi \epsilon [-1, 1]$$

Proof: Let $\alpha$ be restricted initially to the interval $(0,1)$. We use the representation $$U_0{}^+ = U_0 U_1{}^+ = \{U_0 - L + W_1\}$$

where $U_0 \sim \text{Uniform}(0,1)$ and $W_1 \sim \text{Uniform}(0,\alpha)$ are independent. Now, $$\begin{aligned}
E[U_0 U_0{}^+] &= E[U_0(U_0 - L + W_1 + 1)1_{\{U_0-L+W_1<0\}}] + \\
&\quad E[U_0(U_0 - L + W_1)1_{\{0 \leq U_0-L+W_1<1\}}] + \\
&\quad E[U_0(U_0 - L + W_1 - 1)1_{\{U_0-L+W_1 \geq 1\}}] \\
&= E[U_0(U_0 - L + W_1)] + E[U_0 1_{\{W_1 < L - U_0\}}] - \\
&\quad E[U_0 1_{\{W_1 \geq 1 + L - U_0\}}] \\
&= A + B - C
\end{aligned}$$

Next, evaluating the partial expectations we get $$A = E[U_0{}^2] - L E[U_0] + E[U_0] E[W_1] =$$
$$= \frac{1}{3} - \frac{L}{2} + \frac{\alpha}{4} = \frac{4 + 3(R - L)}{12}$$

$$B = E[U_0 P\{W_1 < L - U_0 | U_0\}] =$$
$$E\left[U_0 \frac{L - U_0}{\alpha} 1_{\{U_0 \leq L\}}\right]$$
$$= \int_0^L u \frac{L - u}{\alpha} du = \frac{L^3}{6\alpha}$$

$$C = E[U_0 P\{W_1 \geq 1 + L - U_0 | U_0\}] =$$
$$E\left[U_0 \frac{\alpha - L - 1 + U_0}{\alpha} 1_{\{U_0 \geq 1+L-\alpha\}}\right]$$
$$= \int_{1-R}^1 u \frac{R - 1 + u}{\alpha} du = \frac{3R^2 - R^3}{6\alpha}.$$

Hence, since $E[U_0]E[U_1{}^+] = \frac{1}{4}$ and $$\sigma_{U_0} \cdot \sigma_{U_1{}^+} = \frac{1}{12}, \text{ we get}$$

$$\rho^+(\alpha, \phi) = \frac{A + B - C - \frac{1}{4}}{1/12}.$$

Routine algebraic manipulations now yield the result for $\alpha \epsilon (0,1)$. The limiting cases $\rho^+(0,\phi) \equiv 1$ and $\rho^+(1,\phi) \equiv 0$ are correctly captured by (4.1), since for $\alpha = 0$, $D_x = \{x\}$, and for $\alpha = 1$, $D_x = [0,1)$.

Corollary 4: For any $\alpha \epsilon [0,1]$, $\phi \epsilon [-1,1]$, we have $\rho^+(\alpha,\phi) = \rho^+(\alpha,-\phi)$, since $\rho^+(\alpha,\phi)$ is a function of $\phi^2$. Thus, TES($\theta^+$, L, R) and TES($\theta^+$, R, L) yield the same lag-1 autocorrelation.

Theorem 2: Let $\{U_n{}^-\}$ be generated by TES$^-(\alpha,\phi)$. Then, $$\rho_1{}^- = \rho^-(\alpha, \phi) = -\rho^+(\alpha, \phi) = \quad (4.2)$$

-continued
$$-1 + \frac{3 + 3\phi^2}{2}\alpha - \frac{1 + 3\phi^2}{2}\alpha^2,$$

$$\alpha \epsilon [0, 1], \phi \epsilon [-1, 1].$$

Proof: Immediate from the relations $$\rho^-(\alpha,\phi) = -\rho^+(\alpha,-\phi) = -\rho^+(\alpha,\phi),$$

where the first equality is justified by Corollary 2, and the second one by Corollary 4.

The analytical behavior of $\rho^+(\alpha,\phi)$ and $\rho^-(\alpha,\phi)$ is straightforward. Since they differ only by opposing signs, we concentrate on $\rho^+(\alpha,\phi)$. Solving the equation $\rho^+(\alpha,\phi) = 0$ for $\alpha$ with $\phi$ viewed as a parameter, one finds that its zeros $\alpha_1$ and $\alpha_2$, are real non-negative for all $\phi$. In fact, $$\alpha_1 = 1, \alpha_2 = \frac{2}{1 + 3\phi^2} \quad (4.3)$$

Notice that $\alpha_1 \geq 1$ implies $\phi^2 \leq \frac{1}{3}$. For $\phi^2 > \frac{1}{3}$, $\rho^+(\alpha,\phi)$ is negative for $$\frac{2}{1 + 3\phi^2} < \alpha < 1$$

reaching a minimum at $$\alpha_{min}(\phi) = \frac{3}{2} \cdot \frac{1 + \phi^2}{1 + 3\phi^2} \text{ of } \rho(\alpha_{min}(\phi), \phi) =$$

$$1 - \frac{9}{8} \cdot \frac{(1 + \phi^2)^2}{1 + 3\phi^2}.$$

Now, the pair of curves $$\alpha = \frac{2}{1 + 3\phi^2}$$

partition the open $(\alpha,\phi)$ rectangular $R = (0,1) \times (-1,1)$ into sets F, G and H defined by $$F = \left\{(\alpha, \phi) \epsilon R: \alpha = \frac{2}{1 + 3\phi^2}\right\} \quad (4.4)$$

$$G = \left\{(\alpha, \phi) \epsilon R: \frac{1}{3} < \phi^2 < 1 \text{ and } \frac{2}{1 + 3\phi^2} < \alpha < 1\right\} \quad (4.5)$$

$$H = R - G - F \quad (4.6)$$

such that $\rho^+(\alpha,\phi)$ is positive on H, negative on G and vanishes on F. For $\rho^-(\alpha,\phi)$, the roles of G and H are reversed.

From the viewpoint of simulation applications, this section can be summarized as follows.

Corollary 5: Let $\{r_n\}$ be any sequence of reals such that $-1 < r_n < 1$, and let $U_0 \sim \text{Uniform}(0,1)$ be given. Then, for each $n \geq 1$, there is a TES method $T_n$ that operates on a uniform variate $U_{n-1}$ yielding a uniform variate $U_n$ such that $$\text{Corr}[U_{n-1}, U_n] = r_n, \quad n \geq 1.$$

Furthermore, if $0 < r_n < 1$, then $T_n = TES^+(\alpha, \phi)$ for any pair $(\alpha, \phi) \in H$ satisfying the equation $\rho^+(\alpha, \phi) = r_n$, i.e., $$1 - r_n - \frac{3 + 3\phi^2}{2}\alpha + \frac{1 + 3\phi^2}{2}\alpha^2 = 0, (\alpha, \phi) \in H,$$

or $T_n = TES^-(\alpha, \phi)$ for any pair $(\alpha, \phi) \in G$ satisfying the equation $\rho^-(\alpha, \phi) = r_n$, i.e., $$1 + r_n - \frac{3 + 3\phi^2}{2}\alpha + \frac{1 + 3\phi^2}{2}\alpha^2 = 0, (\alpha, \phi) \in G.$$

Similarly, if $-1 < r_n < 0$, then $T_n = TES^-(\alpha, \phi)$ for any pair $(\alpha, \phi) \in H$ satisfying $\rho^-(\alpha, \phi) = r_n$, or $T_n = TES^+(\alpha, \phi)$ for any pair $(\alpha, \phi) \in G$ satisfying $\rho^+(\alpha, \phi) = r_n$. In either case $(-1 < r_n < 1)$, for each $-1 \leq \phi \leq 1$ there is a unique solution for $\alpha$ such that $(\alpha, \phi)$ lies in the region H.

The correlation coefficients $r_n$ need not be constant, because a TES method generates $U_{n+1}$ as a function of $U_n$, $r_n$ and the value $W_n$ from an i.i.d. Uniform(0,1) random number stream. Consequently, the sequence $\{r_n\}$ need not even be deterministic; one can simulate models where a random mechanism generates the correlations $r_n$, thereby adding another modulation component to the $\{U_n\}$.

The computation of higher lag autocorrelations is more complicated. For TES$^+$ sequences, these representations yield for $n = 1, 2, \ldots$ $$\rho_n^+(\alpha, \phi) = \frac{12}{\alpha^n(n+2)!} \sum_{k=0}^{n} \binom{n}{k}(-1)^k \overline{B}_{n+2}\left(\frac{\alpha(1-\phi)n}{2} - \alpha k\right),$$

where $\overline{B}_n(X)$ is the Bernoulli function of order n obtained from the Bernoulli polynomials by their periodic extension from the interval [0,1) to the entire real line (see Knopp Theory and Application of Infinite Series, published by Blackil and Son, London and Glasgow (1946)). The $\rho^-(\alpha, \phi)$ can be easily obtained from the last equation via Corollary 2.

Finally, some aspects concerning the use of TES methods as models for correlated data sequences will be discussed, also touching briefly on some of their statistical properties as gleaned from computer-generated runs.

First, it is to be noted that restricting the sequence $\{U_n\}$ to have uniform marginals is usually without loss of control over the attendant lag-1 autocorrelation. More specifically, let $\{X_n\}$ be a real stationary random sequence with marginal distribution F. Suppose that each $X_n = F^{-1}(U_n)$ is obtained by an inversion method from an underlying sequence $\{U_n\}$ with Uniform(0,1) marginals (see Bratley, et al A Guide to Simulation, published by Springer-Verlag (1987), Devroye Non-Uniform Random Variate Generation, published by Springer-Verlag (1986)). For a prescribed $-1 \leq \rho X \leq 1$, require that $$\text{Corr}[X_n, X_{n+1}] = \rho X, n \geq 0,$$

and find $(\alpha, \phi)$ such that $\rho(\alpha, \phi)$ for $\{U_n\}$ gets transformed to $\rho X$ for $\{X_n\}$. Now, it is known that the extremal correlations are attained as follows:

$\text{Corr}[F^{-1}(U_n), F^{-1}(U_n)]$ (positive extremal)

$\text{Corr}[F^{-1}(U_n), F^{-1}(1-U_n)]$ (negative extremal)

Since we can find a TES method to generate $\{U_n\}$ with any lag-1 autocorrelation $-1 \leq \rho \leq 1$, we expect that any lag-1 autocorrelation can also be induced on the $\{X_n\}$ spanning the interval between their extremal values $(\rho_{min}, \rho_{max})$. Note that this interval may be properly contained in $(-1,1)$; for example, the extremal negative correlation for the exponential case is about 0.645. Observe that $\rho^+(\alpha, \phi)$ and $\rho^-(\alpha, \phi)$ are monotonic in $(\alpha, \phi)$ in the region H (but not in G). Consequently, $\rho X(\alpha, \phi)$ is also monotonic in $(\alpha, \phi)$ in the region H approaching its extremal values where $\rho^+(\alpha, \phi)$ or $\rho^-(\alpha, \phi)$ approach theirs. The transformation $\rho X(\alpha, \phi) \rightarrow \rho(\alpha, \phi)$ is then monotonic in $(\alpha, \phi)$, a fact useful in generating conversion tables for each F.

Recall that Corollary 5 implies that a TES method has two "degrees of freedom", namely, $\alpha$ and $\phi$. Since Eqs. (4.1) and (4.2) for $\rho^+(\alpha, \phi)$ and $\rho^-(\alpha, \phi)$ are quadratic in both $\alpha$ and $\phi$, their behavior is readily understood. Clearly, the magnitude of $\rho^+$ and $\rho^-$ decreases in the magnitude of $\alpha$ and $\phi$ in the region H. However, the $\alpha$ parameter provides here the primary controlling effect; in other words, for fixed $\phi$, any lag-1 autocorrelation can be obtained by an appropriate choice of $\alpha$. The effect of $\phi$ on the correlation is secondary. If we fix $\alpha$ and set the extremal values $\phi = 0$ and $|\phi| = 1$ in $\rho^+(\alpha, \phi)$ or $\rho^-(\alpha, \phi)$ we get $$|\rho^+(\alpha, 1) - \rho^+(\alpha, 0)| = |\rho^-(\alpha, 1) - \rho^-(\alpha, 0)| = \frac{3\alpha(1-\alpha)}{2}$$

and this difference attains its maximal value at $\alpha = \frac{1}{2}$ resulting in a maximal difference of $\frac{3}{8}$. However, $\phi$ controls an important aspect of the sample path behavior of $\{U_n\}$, namely, its drift (or "velocity") around the circular unit interval. Recall that in Eq. (3.5), p and q can be taken to measure the left (counter-clockwise) and right (clockwise) drift of $\{U_n\}$ so that $\phi = q - p$ can be interpreted as the net drift of $U_{n+1}$ relative to $U_n$ around the circular unit interval. Intuitively, $\phi$ measures how often $\{U_n\}$ crosses a given point in a given direction. Note that the function $\theta(\cdot)$ itself can provide a drift component; however, for $\theta^+(\cdot)$ and $\theta^-(\cdot)$ (i.e., identify and reflection), this component is zero and $\phi$ can be justifiably argued to fully account for the (standardized) velocity of $\{U_n\}$.

The sample paths of TES$^+$ are cyclical in nature. Qualitatively speaking, they exhibit a discontinuity in the neighborhood of the point 0 due to wraparound. When crossing 0 clockwise on the circular interval, one passes from relatively large values to relatively small ones, and conversely when crossing counter-clockwise. This effect in the sample paths will make sense when modeling physical phenomena with a cyclical nature where "resetting" punctuates runs of uptrending or downtrending observations, though the runs need not be monotonic. Naturally, this is not always justifiable from a modeling viewpoint. A possible extension of these principles is to find TES methods whose sample paths look more "continuous" than those introduced here. This will mean that the underlying process $\{U_n\}$ is prevented from crossing point 0 by treating it as a reflecting boundary. Mathematically, this will require other solutions for $\theta(\cdot)$ and $\delta(\cdot)$ in Eq. (3.2). It is tempting to try a linear autoregressive scheme (without the modulo 1 operation). More specifically, consider $$U_{n+1} = U_n - a(U_n) + b(U_n)W_{n+1} \quad (5.1)$$

where $0 \leq a(y), b(y) < 1, y \in [0,1]$, are continuous deterministic functions and $W_{n+1} \sim \text{Uniform}(0,1)$ is the innovation, subject to the constraints $$y - a(y) \geq 0, \ y \in [0,1] \quad (5.2)$$

$$y - a(y) + b(y) < 1, \ y \in [0,1] \quad (5.3)$$

(constraints (5.2)-(5.3) ensure that $D_{\theta(y)}$ never straddles the point 0). However, the scheme (5.1) with the constraints (5.2)-(5.3) can only be satisfied trivially, as the following Proposition makes precise.

Proposition 3: If the sequence $\{U_n\}$ in (5.1) is to have Uniform(0,1) marginals, then necessarily $a(y) = y$ and $b(y) = 1$ for almost every $y \in [0,1)$.

Proof: For $0 \leq y \leq 1, 0 \leq x < 1$, $$P\{U_{n+1} \leq x | U_n = y\} = P\{y - a(y) + b(y)W_{n+1} \leq x\} = \frac{x - y + a(y)}{b(y)}$$

Hence, $$P\{U_{n+1} \leq x\} = \int_0^1 \frac{x - y + a(y)}{b(y)} dy, \ x \in [0, 1).$$

By assumption, $$P\{U_{n+1} \leq x\} = x, \ x \in [0,1).$$

Equating the righthand sides above, we get $$x \int_0^1 \left(1 - \frac{1}{b(y)}\right) dy = \int_0^1 \frac{a(y) - y}{b(y)} dy, \ x \in [0, 1).$$

For this functional equation to hold we must have $$\int_0^1 \frac{a(y) - y}{b(y)} dy = 0 \quad (5.4)$$

$$\int_0^1 \frac{b(y) - 1}{b(y)} dy = 0 \quad (5.5)$$

From (5.2) and (5.4) we conclude that $a(y) - y = 0$ or equivalently $a(y) = y$, almost everywhere. From (5.2) and (5.3) it follows that $b(y) \leq 1$ which together with (5.5) implies $b(y) - 1 = 0$ or equivalently $b(y) = 1$, almost everywhere.

Thus, the autogressive scheme (5.1) reduces to $U_{n+1} = W_{n+1}$ which corresponds to the trivial case of the i.i.d. Uniform(0,1) stream.

We now illustrate how a fitting methodology might be employed to fit a TES method to observed data. The discussion is kept at an intuitive level and is meant to outline the issues rather than to treat them in depth. Suppose we have a sample sequence $\{\hat{U}_n\}_{n=0}^N$ assumed to be stationary and with values in [0,1). We would like to capture the lag-1 autocorrelation as well as its drift through a TES method T. Let $\hat{r}$ be an estimate of the lag-1 autocorrelation, and let $\hat{\phi} = \hat{q} - \hat{p}$ be an estimate of the drift $\phi$. Then, use $T = TES^+$ or $T = TES^-$ according as $\hat{r}$ is non-negative or non-positive, respectively, and estimate $\alpha$ by solving (for $\hat{\alpha}$) as explained in Corollary 5. This could be satisfactory if the data satisfy $$d_c(\hat{U}_n, \hat{U}_{n+1}) \leq \alpha, \ n \leq 0. \quad (5.6)$$

If not, one could consider a modified TES method defined as a probabilistic mixture $$U_{n+1} = \begin{cases} \text{the next TES iterate of } U_n, & w.p. \ \pi \\ V_{n+1}, & w.p. \ 1 - \pi \end{cases}$$

where $0 < \pi < 1$ and $V_{n+1} \sim \text{Uniform}(0,1)$ is independent of $U_0, \ldots, U_n$. Note that $\text{Corr}[U_n, U_{n+1}] = \pi \cdot \rho(\alpha, \phi)$ where $\rho(\alpha, \phi)$ is the correlation coefficient in the constituent pure TES method. The effect of the mixture is to introduce regeneration points with probability $1 - \pi$ and, therefore, to dilute the magnitude of the pure TES lag-1 autocorrelation by a factor $\pi$; the resulting $\{U_n\}$ consist of independent runs of pure TES variates of geometrical length (with mean $$\frac{\pi}{1 - \pi}).$$

In general, a mixed TES method gets around the degeneracy aspect of pure TES methods which stipulate (5.6) with probability 1.

Estimating $\phi$ can sometimes be difficult. A simple approach is to estimate p and q by the relative frequency of local increases or decreases, i.e., $$\hat{p} = \frac{1}{N} \#\{n: U_{n+1} \geq U_n\} \quad \text{(increasing data)}$$

$$\hat{q} = \frac{1}{N} \#\{n: U_{n+1} \leq U_n\} \quad \text{(decreasing data)}$$

where # is the cardinality of the following set. This can be expected to work well when the data exhibit high lag-1 autocorrelation so that successive values are relatively close in the sense of the metric $d_c$. Otherwise, it is hard to distinguish between increases (decreases) and the effect of the modulo 1 operation resulting from crossing the point 0 in either direction. Thus, for relatively large $\alpha$ ($\alpha \geq \frac{1}{2}$) it is not clear how to assign a pair of successive observations into $\hat{p}$ or $\hat{q}$, even when the simple estimators $\hat{p}$ and $\hat{q}$ above are replaced by the more realistic ones $$\hat{p} = \frac{1}{N} \#\{n: U_{n+1} \leq_c U_n\}$$

$$\hat{q} = \frac{1}{N} \#\{n: U_n \leq_c U_{n+1}\}$$

where $\leq_c$ is the circular positioning relation defined in Eqs. (2.5)-(2.6).

If there is to be provided a prescribed autocorrelation in the TES generated sequence, it is important to be able to measure the desired correlation to be prescribed.

We now proceed to describe fast numerical methods for calculating the autocorrelation (and autocovariance) functions of TES sequences, as well as their transformed variety.

A basic result we shall employ to study autocorrelation properties is the Poisson Summation Formula which states that if g is a differentiable function such that both $$\int_{-\infty}^{\infty} |g(x)|dx \text{ and } \int_{-\infty}^{\infty} |g'(x)|dx$$

exist, then $$\sum_{n=-\infty}^{\infty} g(x+n) = \sum_{\nu=-\infty}^{\infty} e^{i2\pi\nu x} \int_{-\infty}^{\infty} e^{-i2\pi\nu y} g(y) dy \qquad (7.1)$$

($i=\sqrt{-1}$). The righthand side of (7.1) is the Fourier series of the periodic function $$h(x) = \sum_{n=-\infty}^{\infty} g(x+n),$$

and the integrals are the corresponding Fourier coefficients. Note that (7.1) can be written in the form $$\sum_{n=-\infty}^{\infty} g(x+n) = \sum_{\nu=-\infty}^{\infty} e^{i2\pi\nu x} \tilde{g}(i2\pi\nu). \qquad (7.2)$$

Finally, the following simple proposition will be frequently used.

Proposition 1

Let h(x) be a real function whose Laplace Transform $$\tilde{h}(s) = \int_{-\infty}^{\infty} e^{-sx} h(x) dx$$

exists.

Then, $\tilde{h}(ir)$ and $\tilde{h}(-ir)$ are complex conjugate for any real r.

Proof

The complex exponential pairs $e^{ir}=\cos(r)+i\sin(r)$ and $e^{-ir}=\cos(r)-i\sin(r)$ are obviously complex conjugates. Since $\tilde{h}(ir)$ and $\tilde{h}(-ir)$ are obtained by integrating these with respect to h(x)dx, it follows that $\tilde{h}(ir)$ and $\tilde{h}(-ir)$ are also complex conjugates.

Now we derive the transition structure of general TES sequences. Denote by $g_\tau^+(y|x)$ the conditional density of $U_\tau^+$ given $U_0=x$, and by $g_\tau^-(y|x)$, the conditional density of $U_\tau^-$ given $U_0=x$. In the next two lemmas we proceed to calculate the conditional densities above; note that we make no assumptions on the $f_n(x)$.

Lemma 2 $\{U_n^+\}$ is a stationary Markov process with transition density $g_\tau^+(y|x)$, where for $\tau = 0, 1, \ldots$ $$g_\tau^+(y|x) = \begin{cases} \sum_{\nu=-\infty}^{\infty} \tilde{f}_\tau(i2\pi\nu)e^{i2\pi\nu(y-x)}, & 0 \leq y, x < 1 \\ 0, & \text{otherwise} \end{cases} \qquad (8.1)$$

or in real form, $$g_\tau^+(y|x) = \qquad (8.2)$$

$$\begin{cases} 1 + 2 \sum_{\nu=1}^{\infty} Re[\tilde{f}_\tau(i2\pi\nu)e^{i2\pi\nu(y-x)}], & 0 \leq y, x < 1, \tau \geq 0 \\ 0, & \text{otherwise} \end{cases}$$

Proof $\{U_n^+\}$ is stationary Markovian by construction; see Eq. (3.1).

For $\tau=0$, both sides of Eq. (3.1) reduce to the Dirac function $\delta(y-x)$. For $\tau>0$ we can write by virtue of (1.5), $$\tilde{g}_\tau^+(s|x) = E[e^{-sU_\tau^+}|U_0=x] = E[e^{-s\{x+S_\tau\}}] =$$

$$\int_{-\infty}^{\infty} e^{-s\{x+\sigma\}} f_\tau(\sigma) d\sigma = \sum_{\nu=-\infty}^{\infty} \int_{\nu}^{\nu+1} e^{-s\{x+\sigma\}} f_\tau(\sigma) d\sigma$$

Since the function $e^{-s\{x+\sigma\}}$ is periodic in $\sigma$ (period 1), we can rewrite the above as $$\tilde{g}_\tau^+(s|x) = \sum_{\nu=-\infty}^{\infty} \int_0^1 e^{-s\{x+\sigma\}} f_\tau(\sigma+\nu) d\sigma =$$

$$\int_0^1 e^{-s\{x+\sigma\}} \left[ \sum_{\nu=-\infty}^{\infty} f_\tau(\sigma+\nu) \right] d\sigma =$$

$$\sum_{\nu=-\infty}^{\infty} \tilde{f}_\tau(i2\pi\nu) \int_0^1 e^{-s\{x+\sigma\}+i2\pi\nu\sigma} d\sigma$$

where the interchange of summation and integration in the second equality is justified by uniform convergence, and in the third equality because a Fourier Series can be integrated termwise; note also that we used the Poisson Summation Formula (7.2) in the last equality. Since $0 \leq x < 1$, we can decompose the last integral as follows $$\tilde{g}_\tau^+(s|x) = \sum_{\nu=-\infty}^{\infty} \tilde{f}_\tau(i2\pi\nu) \left[ \int_0^{1-x} + \int_{1-x}^1 \right].$$

Now, $$\int_0^{1-x} = \int_0^{1-x} e^{-s(x+\sigma)+i2\pi\nu\sigma} d\sigma = \frac{e^{-s-i2\pi\nu x} - e^{-sx}}{-s+i2\pi\nu}$$

$$\int_{1-x}^1 = \int_{1-x}^1 e^{-s(x+\sigma-1)+i2\pi\nu\sigma} d\sigma = \frac{e^{-sx} - e^{-i2\pi\nu x}}{-s+i2\pi\nu}$$

whence, after adding the integrals, $$\tilde{g}_\tau^+(s|x) =$$

$$\sum_{\nu=-\infty}^{\infty} e^{-i2\pi\nu x} \frac{\tilde{f}_\tau(i2\pi\nu)}{s-i2\pi\nu} - e^{-s} \sum_{\nu=-\infty}^{\infty} e^{-i2\pi\nu x} \frac{\tilde{f}_\tau(i2\pi\nu)}{s-i2\pi\nu}$$

$$= \tilde{c}_\tau(s|x) - \tilde{d}_\tau(s|x).$$

But $$\frac{1}{s-i2\pi\nu}$$

is the Laplace Transform of the function $e(y) = e^{i2\pi v y} 1(y \geq 0)$, so inverting $\tilde{c}_\tau(s|x)$ yields $$c_\tau(y|x) = \sum_{v=-\infty}^{\infty} e^{i2\pi v(y-x)} \tilde{f}_\tau(i2\pi v) 1(y \geq 0).$$

The effect of $e^{-s}$ in $\tilde{d}_\tau(s|x)$ is translation by 1, so inverting $\tilde{d}_\tau(s|x)$ yields $$d_\tau(y|x) = \sum_{v=-\infty}^{\infty} e^{i2\pi v(y-1-x)} \tilde{f}_\tau(i2\pi v) 1(y \geq 1) =$$

$$\sum_{v=-\infty}^{\infty} e^{i2\pi v(y-x)} \tilde{f}_\tau(i2\pi v) 1(y \geq 1).$$

by the periodicity of the complex exponential. Eq. (3.1) now follows by calculating $g_\tau^+(y|x) = c_\tau(y|x) - d_\tau(y|x)$ from the expressions above. Finally, Eq. (8.2) follows from Eq. (8.1) by noting that the term for $v=0$ evaluates to 1; furthermore, terms corresponding to index pairs $(-v,v)$ are complex conjugates by Proposition 1, so summing them yields twice their real part.

Lemma 3

$\{U_n^-\}$ is a stationary Markov process with transition density $g_\tau^-(y|x)$, where for $\tau = 0, 1, \ldots$ $$g_\tau^-(y|x) = \begin{cases} g_\tau^+(y|x), & \tau \text{ even} \\ g_\tau^+(1-y|x), & \tau \text{ odd} \end{cases}$$

Since the case for $\tau$ even was already computed in Lemma 2, it remains to prove (3.2) for the case $\tau$ odd. Substituting $1-y$ for $y$ in (8.1) now yields Eq. (8.3) immediately $$g_\tau^-(y|x) = \sum_{v=-\infty}^{\infty} \tilde{f}_\tau(i2\pi v) e^{i2\pi v(1-y-x)} =$$

$$= \sum_{v=-\infty}^{\infty} \tilde{f}_\tau(i2\pi v) e^{i2\pi v(-y-x)}$$

where the last equality follows by the periodicity of the complex exponential. Eq. (8.4) follows from Eq. (8.3) by an argument analogous to that at the end of Lemma 2.

Lemmas 2 and 3 easily specialize to TES processes with uniform marginals.

Corollary 1

For $TES^+(\alpha,\phi)$ and $TES^-(\alpha,\phi)$, the corresponding transition densities are for $\tau \geq 0$, $$g_\tau^+(y|x) = \begin{cases} 1 + 2 \sum_{v=1}^{\infty} \left( \frac{\sin(\pi v \alpha)}{\pi v \alpha} \right)^\tau \cos(\pi v \alpha \phi \tau - 2\pi v(y-x)), & 0 \leq y, x < 1 \\ 0, & \text{otherwise} \end{cases} \quad (8.5)$$

$$g_\tau^-(y|x) = \begin{cases} 1 + 2 \sum_{v=1}^{\infty} \left( \frac{\sin(\pi v \alpha)}{\pi v \alpha} \right)^\tau \cos(\pi v \alpha \phi \tau - 2\pi v(y-x)), & 0 \leq y, x < 1, \tau \text{ even} \\ 1 + 2 \sum_{v=1}^{\infty} \left( \frac{\sin(\pi v \alpha)}{\pi v \alpha} \right)^\tau \cos(\pi v \alpha \phi \tau + 2\pi v(y+x)), & 0 \leq y, x < 1, \tau \text{ odd} \\ 0, & \text{otherwise} \end{cases} \quad (8.6)$$

$$g_\tau^-(y|x) = \begin{cases} \sum_{v=-\infty}^{\infty} \tilde{f}_\tau(i2\pi v) e^{i2\pi v(y-x)}, & 0 \leq y, x < 1, \tau \text{ even} \\ \sum_{v=-\infty}^{\infty} \tilde{f}_\tau(i2\pi v) e^{-i2\pi v(y+x)}, & 0 \leq y, x < 1, \tau \text{ odd} \\ 0, & \text{otherwise} \end{cases} \quad (8.3)$$

or in real form, $$g_\tau^-(y|x) = \quad (8.4)$$

$$\begin{cases} 1 + 2 \sum_{v=1}^{\infty} Re[\tilde{f}_\tau(i2\pi v) e^{i2\pi v(y-x)}], & 0 \leq y, x < 1, \tau \text{ even} \\ 1 + 2 \sum_{v=1}^{\infty} Re[\tilde{f}_\tau(i2\pi v) e^{-i2\pi v(y+x)}], & 0 \leq y, x < 1, \tau \text{ odd} \\ 0, & \text{otherwise} \end{cases}$$

Proof $\{U_n^-\}$ is stationary Markovian by construction; see Eq. (8.4). Directly from Eq. (8.4) we have Proof From Eq. (1.16), we have $$\tilde{f}_\tau(i2\pi v) = \left( \frac{e^{i\pi v \alpha(1-\phi)} - e^{-i\pi v \alpha(1+\phi)}}{i2\pi v \alpha} \right)^\tau = \quad (8.7)$$

$$\left( \frac{e^{-i\pi v \alpha \phi}}{\pi v \alpha} \right)^\tau \left( \frac{e^{i\pi v \alpha} - e^{-i\pi v \alpha}}{2i} \right)^\tau =$$

$$\frac{e^{-i\pi v \alpha \phi \tau} \sin(\pi v \alpha)^\tau}{(\pi v \alpha)^\tau}$$

where the last equality follows from Euler's Formula for the sine function. The rest follows by substituting (8.7) into (8.2) and (8.4), respectively.

It is of interest to compare TES processes to their time-reversed counterparts which are also stationary Markovian. Let $\{U_n^+\}_{n=0}^\tau$ be a TES+ subsequence and define its time-reversed version $\{\hat{U}_n^+\}_{n=0}^\tau$ by $\hat{U}_n^+ = U_{\tau-n}^+$. Now from Eq. (1.5)

$$U_\tau^+ = \{U_0 + S_\tau\}. \quad (8.8)$$

Using modulo 1 arithmetic rules we can isolate $U_0$ as $U_0 = \{U_\tau^+ - S_\tau\}$, or equivalently in terms of the time-reversed subsequence $$\hat{U}_\tau^+ = \{U_0^+ - S_n\}. \tag{8.9}$$

A comparison of (3.8) and (3.9) shows that a time-reversed TES$^+$ sequence is a TES$^+$ sequence with an innovation sequence $\{\hat{V}_n\}$ related to $\{V_n\}$ by $\hat{V}_n = -V_{\tau-n}$. We refer to the $\hat{V}_n$ as reverse innovations. For the special case of uniform innovations, reverse innovations become $$\hat{V}_n = L - aZ_n = a - R - aZ_n = -R + a(1 - Z_n). \tag{8.10}$$

Since $\{1 - Z_n\}$ is an i.i.d. Uniform(0,1) sequence, the effect of reverse innovations is to change TES$^+$(L,R) to TES$^+$(R,L); equivalently, TES$^+$($a,\phi$) under time reversal becomes TES$^+$($a,-\phi$) by virtue of (1.13).

Consider now the time-reversed subsequence $\{\hat{U}_n^-\}_{n=0}^\tau$ defined by $\hat{U}_n^- = U_{\tau-n}^-$. For even $\tau$, the situation is analogous to TES$^+$ since the even index TES$^-$ subsequence is an even index TES$^+$ subsequence. For odd $\tau$, the situation is quite different. In fact, from Eq. (1.7)

$$U_\tau^- = \{-U_0 - S_\tau\} \tag{8.11}$$

so that $U_0 = \{-U_\tau^- - S_\tau\}$, or equivalently in terms of the time-reversed subsequence $$\hat{U}_\tau^- = -\hat{U}_0 - S_\tau \tag{8.12}$$

Clearly, the representations (8.11) and (8.12) are identical. Therefore, we reach the somewhat surprising conclusion that the odd index subsequence of a TES$^-$ process is time-reversible in the sense that the transition density from $U_0$ to $U_\tau^-$ is identical to the transition density from $U_{96}^-$ to $U_0$. Notice that for TES$^-$ $\hat{V}_n = V_{\tau-n}$, so $\{\hat{V}_n\}$ has the same probability law as $\{V_n\}$ (permuting the indices of an i.i.d. sequence has no effect on the joint distribution).

To check our conclusions, we compare $g_\tau^+(y|x)$ or Eq. (8.1) and $g^-(y,x)$ of Eq. (8.3) to their time-reversed counterparts $\hat{g}_\tau^+(y|x)$ and $\hat{g}_\tau^-(y|x)$. For TES$^+$, the effect of reverse innovations is to reverse the sign of the argument in density transforms; that is, we should substitute $\tilde{f}_\tau(-i2\pi v)$ for $\tilde{f}_\tau(i2\pi v)$ in Eq. (8.1). We then have the relation $$\hat{g}_\tau^+(y|x) = \sum_{v=-\infty}^\infty \tilde{f}_\tau(-i2\pi v)e^{i2\pi v(y-x)} = g_\tau^+(x|y). \tag{8.13}$$

To see that, note that reversing y and x in the sum in (8.13) yields the same sum as in (8.1) (except that the order of summation is changed). For TES$^-$ and $\tau$ odd, we have immediately $$\hat{g}_\tau^-(y|x) = g_\tau^-(y|x) = g_\tau^-(x|y) \tag{8.14}$$

as expected.

Consider the sequences $\{X_n^+\}_{n=0}^\infty$ and $\{X_n^-\}_{n=0}^\infty$ where $X_n^+ = D(U_n^+)$ and $X_n^- = D(U_n^-)$ are both assumed to have finite second moment. Now we derive the autocovariance functions of $\{X_n^+\}$ and $\{X_n^-\}$. We first obtain the autocovariance function $\Psi_x^+(\tau)$ of the sequence $\{X_n^+\}$ with the aid of Lemma 2.

It can be shown that for $\tau = 0, 1, \ldots$ $$\psi_x^+(\tau) = \sum_{\substack{v=-\infty \\ v \neq 0}}^\infty \tilde{f}_\tau(i2\pi v)|\tilde{D}(i2\pi v)|^2 \tag{9.1}$$

or in real form, $$\psi_x^+(\tau) = 2\sum_{v=1}^\infty Re[\tilde{f}_\tau(i2\pi v)]|\tilde{D}(i2\pi v)|^2. \tag{9.2}$$

It can also be shown that for $\tau = 0, 1, \ldots$ $$\psi_x^-(\tau) = \begin{cases} \sum_{\substack{v=-\infty \\ v \neq 0}}^\infty \tilde{f}_\tau(i2\pi v)|\tilde{D}(i2\pi v)|^2, & \tau \text{ even} \\ \sum_{\substack{v=-\infty \\ v \neq 0}}^\infty \tilde{f}_\tau(i2\pi v)Re[\tilde{D}(i2\pi v)^2], & \tau \text{ odd} \end{cases} \tag{9.3}$$

or in real form, $$\psi_x^-(\tau) = \begin{cases} 2\sum_{v=1}^\infty Re[\tilde{f}_\tau(i2\pi v)]|\tilde{D}(i2\pi v)|^2, & \tau \text{ even} \\ 2\sum_{v=1}^\infty Re[\tilde{f}_\tau(i2\pi v)]Re[\tilde{D}(i2\pi v)^2], & \tau \text{ odd} \end{cases} \tag{9.4}$$

An interesting consequence of Theorems 1 and 2 is that replacing the innovation sequence $\{V_n\}$ by its reverse counterpart $\{\hat{V}_n\}$, where $\hat{V}_n = -V_{\tau-n}$, leaves the autocorrelation structure unchanged. To see that note that the effect of reverse innovations is to replace $\tilde{f}_\tau(i2\pi v)$ by $\tilde{f}_\tau(-i2\pi v)$ everywhere in Theorems 1 and 2. But Eq. (9.2) and (9.4) do not change because $Re[\tilde{f}_\tau(-i2\pi v)] = Re[\tilde{f}_\tau(i2\pi v)]$ (from Proposition 1 we take the real part of complex conjugates). In particular, for uniform innovations, Eq. (8.9) implies that reverse innovations change TES$^+$(L,R) to TES$^+$(R,L). But Eq. (1.13) implies that this is equivalent to replacing $\phi$ by $-\phi$. We conclude that TES$^+$($a,\phi$) and TES$^+$($a,-\phi$) have the same autocovariance function $\Psi_x^+(\tau)$; similarly, TES$^-$($a,\phi$) and TES$^-$($a,-\phi$) have the same autocorrelation function $\Psi_x^-(\tau)$. The transition structure (and the sample paths) are, of course, quite different, except for odd index TES$^-$ subsequences.

Finally, we point out that Theorem 1 and 2 can be modified to accommodate non-stationary TES sequences. If the innovations $\{V_n\}$ are non-stationary, then Eqs. (9.1)-(9.4) will still hold. If, however, we replace D by a a distortion sequence $\{D_n\}$, then Eqs. (9.1) and (9.2) must be modified. Specifically, one must replace $|D(i2\pi v)|^2$ by $D_0(i2\pi v)D_\tau(-i2\pi v)$ and $D(i2\pi v)^2$ by $D_0(i2\pi v)D_\tau(i2\pi v)$. Furthermore, the real form Eqs. (4.2) and (4.4) can no longer be deduced, since their proof depends heavily on stationarity.

The general formulas in Theorem 1 and Theorem 2 can be specialized in two ways: by specializing the density f of the innovations $\{V_n\}$, or by specializing the distortion D to yield arbitrary marginals. We proceed to specialize Theorem 1 and 2 through a sequence of corollaries.

Uniform Innovation and General Distortion

We begin with the important special case of uniform innovations. Computationally, this is the most useful specialization of Eqs. (9.1)–(9.4). Recall that the uniform innovation assumption implies that the $V_n$ are of the from (1.14) and the corresponding $\tilde{f}_\tau(s)$ are given by (1.16) and (8.7). Define $$\tilde{D}(i2\pi v) = a_v + ib_v, v \geq 1 \tag{10.1}$$

Then for each $v \geq 1$, $$|\tilde{D}(i2\pi v)|^2 = a_v^2 + b_v^2 \tag{10.2}$$

and $$Re[\tilde{D}(i2\pi v)^2] = a_v^2 - b_v^2. \tag{10.3}$$

Corollary 2

$$\psi_X^+(\tau) = 2 \sum_{v=1}^{\infty} \left(\frac{\sin(\pi v \alpha)}{\pi v \alpha}\right)^\tau \cos(\pi v \alpha \phi \tau)[a_v^2 + b_v^2], \tag{10.4}$$

$$\tau = 0, 1, \ldots$$

Corollary 3

$$\psi_X^-(\tau) = \begin{cases} 2 \sum_{v=1}^{\infty} \left(\frac{\sin(\pi v \alpha)}{\pi v \alpha}\right)^\tau \cos(\pi v \alpha \phi \tau)[a_v^2 + b_v^2], & \tau \text{ even} \\ 2 \sum_{v=1}^{\infty} \left(\frac{\sin(\pi v \alpha)}{\pi v \alpha}\right)^\tau \cos(\pi v \alpha \phi \tau)[a_v^2 - b_v^2], & \tau \text{ odd} \end{cases} \tag{10.5}$$

Proof

It is to be noted that Eqs. (10.4) and (10.5) provide the basis for practical numerical calculations of $\Psi_X^+(\tau)$ and $\Psi_X^-(\tau)$, for TES methods with uniform innovations.

The case of uniform innovation and linear distortion $D(x) = cx + d$ (c, d real) corresponds to Uniform(c,d) marginals. A simple calculation yields $$\tilde{D}(s) = \int_0^1 e^{-sx}(cx + d)dx = \frac{d}{s} + \frac{c}{s^2} - e^{-s}\left[\frac{c+d}{s} + \frac{c}{s^2}\right] \tag{10.6}$$

whence $$\tilde{D}(i2\pi v) = i\frac{c}{2\pi v}, v \geq 1.$$

Corollary 4

For the uniform innovation and linear distortion case $$a_v = 0 \tag{10.7}$$

$$b_v = \left(\frac{c}{2\pi v}\right)^2. \tag{10.8}$$

The special case of the identity distortion $D(x) = x$, obtained for $c = 1$ and $d = 0$, yields the Uniform(0,1) TES sequences $\{U_n^+\}$ and $\{U_n^-\}$. Now, we use Eqs. (9.2) and (9.4) to give explicit expressions for the entire autocorrelation coefficient function $\rho_U^+(\tau)$; the autocorrelation coefficient function $\rho_U^-(\tau)$ is easily deduced with the aid of Eq. (1.9).

The uniform innovation assumption in (1.14) means that each $f_n(x)$ has Laplace transform given by (1.15) or (1.16). The representations of $\Psi_U^+(\tau)$ and $\Psi_U^-(\tau)$ are summarized in the following corollaries with the aid of two auxiliary functions $$\psi_c(\tau) = \frac{1}{\alpha^\tau} \sum_{k=0}^{\tau} \binom{\tau}{k}(-1)^k \sum_{v=1}^{\infty} \frac{2\cos(2\pi v(L\tau - \alpha v))}{(2\pi v)^{\tau+2}} \tag{10.9}$$

and $$\psi_s(\tau) = \frac{1}{\alpha^\tau} \sum_{k=0}^{\tau} \binom{\tau}{k}(-1)^k \sum_{v=1}^{\infty} \frac{2\sin(2\pi v(L\tau - \alpha v))}{(2\pi v)^{\tau+2}} \tag{10.10}$$

Corollary 5

The representations for $\Psi_U^+(\tau)$ and $\Psi_U^-(\tau)$ depend on the value of $\tau$ (mod 4) as follows:

$$\psi_U^+(\tau) = \begin{cases} \psi_c(\tau), & \tau = 0 \text{ (mod 4)} \\ \psi_s(\tau), & \tau = 1 \text{ (mod 4)} \\ -\psi_c(\tau), & \tau = 2 \text{ (mod 4)} \\ -\psi_s(\tau), & \tau = 3 \text{ (mod 4)} \end{cases} \tag{10.11}$$

$$\psi_U^-(\tau) = \begin{cases} \psi_c(\tau), & \tau = 0 \text{ (mod 4)} \\ -\psi_s(\tau), & \tau = 1 \text{ (mod 4)} \\ -\psi_c(\tau), & \tau = 2 \text{ (mod 4)} \\ \psi_s(\tau), & \tau = 3 \text{ (mod 4)} \end{cases} \tag{10.12}$$

The result now follows from (10.9)–(10.10) by noting in succession that $$i^{-\tau} = \begin{cases} 1, & \tau = 0 \text{ (mod 4)} \\ -i, & \tau = 1 \text{ (mod 4)} \\ -1, & \tau = 2 \text{ (mod 4)} \\ i, & \tau = 3 \text{ (mod 4)}. \end{cases}$$

Formulas (10.11) and (10.12) in Corollary 5 reveal an interesting connection with Bernoulli polynomials. Extending the Bernoulli polynomials, (denoted $B_n(x)$) periodically (with period 1) from their restriction to the interval [0,1) to the real line yields the Bernoulli functions (denoted $\bar{B}_n(x)$). It is known that the latter have the representation, $$\bar{B}_n(x) = \begin{cases} (-1)^{\frac{n}{2}+1} n! \sum_{v=1}^{\infty} \frac{2\cos(2\pi v x)}{(2\pi v)^n}, & n \text{ even} \\ (-1)^{\frac{n+1}{2}} n! \sum_{v=1}^{\infty} \frac{2\sin(2\pi v x)}{(2\pi v)^n}, & n \text{ odd} \end{cases} \tag{10.13}$$

Corollary 6

The representations of $\Psi_U^+(\tau)$ in (10.16) and $\Psi_U^-(\tau)$ in (10.17) can be simplified as follows:

$$\psi_U^+(\tau) = \frac{1}{\alpha^\tau(\tau+2)!} \sum_{k=0}^{\tau} \binom{\tau}{k}(-1)^k B_{\tau+2}(L\tau - \alpha k), \quad (10.14)$$

$$\tau = 1, 2, \ldots$$

$$\psi_U^-(\tau) = \frac{(-1)^\tau}{\alpha^\tau(\tau+2)!} \sum_{k=0}^{\tau} \binom{\tau}{k}(-1)^k B_{\tau+2}(L\tau - \alpha k), \quad (10.15)$$

$$\tau = 1, 2, \ldots$$

Corollary 7

$$\rho_U^+(\tau) = \frac{12}{\alpha^\tau(\tau+2)!} \sum_{k=0}^{\tau} \binom{\tau}{k}(-1)^k B_{\tau+2}(L\tau - \alpha k), \quad (10.16)$$

$$\tau = 1, 2, \ldots$$

$$\rho_U^-(\tau) = \frac{(-1)^\tau 12}{\alpha^\tau(\tau+2)!} \sum_{k=0}^{\tau} \binom{\tau}{k}(-1)^k B_{\tau+2}(L\tau - \alpha k), \quad (10.17)$$

$$\tau = 1, 2, \ldots$$

Proof

From $\sigma_U^2 = 1/12$.

Now we keep the setup of Section 5.1, but we specialize to the logarithmic distortion $$D(x) = -\frac{\ln(1-x)}{\lambda} \quad (10.18)$$

(where the ln function denotes the natural logarithm) corresponding to the exponential distribution function $F(x) = 1 - e^{-\lambda x}$. If $\{U_n\}$ is marginally Uniform(0,1), then $\{X_n\} = \{D(U_n)\}$ is marginally Exponential($\lambda$). Our calculations are based on the identities $$\int_0^1 \ln(x)\cos(2\pi\nu x)dx = -\frac{1}{2\pi\nu} Si(2\pi\nu) \quad (10.19)$$

$$\int_0^1 \ln(x)\sin(2\pi\nu x)dx = \frac{1}{2\pi\nu}[Ci(2\pi\nu) - \gamma - \ln(2\pi\nu)] \quad (10.20)$$

where $\gamma \approx 0.57721566$ is Euler's constant and $$Si(y) = \int_0^y \frac{\sin x}{x} dx,$$

$$Ci(y) = -\int_y^\infty \frac{\cos x}{x} dx = \gamma + \ln(y) - \int_0^y \frac{1 - \cos x}{x} dx$$

are respectively the sine integral and the cosine integral. Numerical tables for these functions are available, e.g., in Jahnke and Ende. Tables of Functions with Formulae and Curves, Dover Publications (1945). Our next step is to derive $|\tilde{D}(i2\pi\nu)|^2$ and $\tilde{D}(i2\pi\nu)^2$.

Now, for $\nu \geq 1$, $$\tilde{D}(i2\pi\nu) = -\frac{1}{\lambda} \int_0^1 e^{-i2\pi\nu x} \ln(1-x)dx =$$

-continued $$-\frac{1}{\lambda}\int_0^1 e^{i2\pi\nu x}\ln(x)dx.$$

Decomposing the above into real and imaginary parts gives $$\tilde{D}(i2\pi\nu) = -\frac{1}{\lambda}\int_0^1 \ln(x)\cos(2\pi\nu x)dx -$$

$$i\frac{1}{\lambda}\int_0^1 \ln(x)\sin(2\pi\nu x)dx.$$

Substituting (10.19)–(10.20) into the above yields $$\tilde{D}(i2\pi\nu) = \frac{Si(2\pi\nu) - i(Ci(2\pi\nu) - \gamma - \ln(2\pi\nu))}{2\pi\nu\lambda} \quad (10.21)$$

Corollary 8

For the uniform innovation and logarithmic distortion case, $$a_\nu = \frac{Si(2\pi\nu)}{2\pi\nu\lambda} \quad (10.22)$$

and $$b_\nu = \frac{-(Ci(2\pi\nu) - \gamma - \ln(2\pi\nu))}{2\pi\nu\lambda} \quad (10.23)$$

Next we take D to be a step function with a countable range. For example, this situation arises naturally when an empirical histogram (frequency table) is used to estimate the distribution of a continuous or discrete variate. Formally, let N be a countable set of consecutive positive integers starting from 1. Let $\{p_k: k\epsilon N\}$ be probabilities, (i.e., $p_k \geq 0$, $k\epsilon N$, and $$\sum_{k\epsilon N} p_k = 1).$$

Define $C_0 = 0$ and $$C_k = \sum_{j=1}^{k} p_j, \quad k\epsilon N.$$

Thus, $\{C_k\}_{k\epsilon N}$ is the cumulative distribution of $\{p_k\}_{k\epsilon N}$. Let further $\{r_k: k\epsilon N\}$ be a sequence of reals with the interpretation that each $X_n^+$ or $X_n^-$ assumes the value $r_k$ with probability $p_k$. Consequently, the corresponding distortion is $$D(x) = \sum_{k\epsilon N} 1_{I(k)}(x) r_k, \quad 0 \leq x < 1 \quad (10.24)$$

where the intervals $I(k) = [C_{k-1}, C_k)$, $k\epsilon N$ partition the interval [0,1). Now, from Eq. (10.24)

$$\tilde{D}(s) = \int_0^1 e^{-sx} \sum_{k\epsilon N} 1_{I(k)}(x) r_k dx =$$

$$= \sum_{k\epsilon N} \int_{C_{k-1}}^{C_k} e^{-sx} r_k dx = \sum_{k\epsilon N} r_k \frac{e^{-sC_{k-1}} - e^{-sC_k}}{s}$$

-continued whence, for $v \geq 1$, $$\tilde{D}(i2\pi v) = \sum_{k\in N} r_k \frac{e^{-i2\pi vC_{k-1}} - e^{-i2\pi vC_k}}{i2\pi v} \quad (10.25)$$

$$= \sum_{k\in N} r_k \left[ \frac{\sin(2\pi vC_k) - \sin(2\pi vC_{k-1})}{2\pi v} + i \frac{\cos(2\pi vC_k) - \cos(2\pi vC_{k-1})}{2\pi v} \right].$$

Corollary 9

For the uniform innovation and step function distortion case, $$a_v = \sum_{k\in N} r_k \frac{\sin(2\pi vC_k) - \sin(2\pi vC_{k-1})}{2\pi v} \quad (10.26)$$

and $$b_v = \sum_{k\in N} r_k \frac{\cos(2\pi vC_k) - \cos(2\pi vC_{k-1})}{2\pi v} \quad (10.27)$$

We now illustrate the use of Corollary 9 by applying it to the case of geometric marginals; that is, we make the following identifications: $N = \{\text{integer } k : k \geq 1\}$, $r_k = k$, $p_k = (1-q)q^{k-1}$ and $C_k = 1 - q^k$ for some $0 < q < 1$, for all $k\in N$. Substituting the above into (10.23) and (10.24) yields $$a_v = \sum_{k=1}^{\infty} k \frac{\sin(2\pi vq^{k-1}) - \sin(2\pi vq^k)}{2\pi v}$$

$$b_v = \sum_{k=1}^{\infty} k \frac{\cos(2\pi vq^{k-1}) - \cos(2\pi vq^k)}{2\pi v}$$

These can be further simplified with the aid of Abel's summation by parts formula, which states that for a real sequence $\{A_k\}$ such that $$kA_k \to 0, \quad k \uparrow \infty$$

we have $$\sum_{k=1}^{\infty} k(A_k - A_{k+1}) = \sum_{k=1}^{\infty} A_k.$$

Corollary 10

For the uniform innovation and geometric marginal case, we have ($v \geq 1$)

$$a_v = \frac{1}{2\pi v} \sum_{k=1}^{\infty} \sin(2\pi vq^k) \quad (10.28)$$

and $$b_v = \frac{1}{2\pi v} \sum_{k=1}^{\infty} (1 - \cos(2\pi vq^k)). \quad (10.29)$$

Next we take D to be the linear distortion $D(x) = cx + d$ but leave the innovations arbitrary. Recall that by Lemma 1 the generated sequences $\{X_n^+\}$ and $\{X_n^-\}$ are still marginally uniform.

Corollary 11

For $\tau = 0, 1, \ldots$ $$\psi_{U^+}(\tau) = 2c^2 \sum_{v=1}^{\infty} \frac{Re[\tilde{f}_\tau(i2\pi v)]}{(2\pi v)^2} \quad (10.30)$$

$$\psi_{U^-}(\tau) = \begin{cases} 2c^2 \sum_{v=1}^{\infty} \frac{Re[\tilde{f}_\tau(i2\pi v)]}{(2\pi v)^2}, & \tau \text{ even} \\ -2c^2 \sum_{v=1}^{\infty} \frac{Re[\tilde{f}_\tau(i2\pi v)]}{(2\pi v)^2}, & \tau \text{ odd} \end{cases} \quad (10.31)$$

Proof

We conclude by observing that Eq. (10.30) and (10.31) are in agreement with Eq. (1.10).

Summarizing, Theorems 1 and 2 provide the theoretical basis for numerical computation of autocorrelation functions of transformed TES sequences. To check the efficacy of our methods, we compared them against Monte Carlo simulations for some of the special cases developed in above and found excellent agreement.

Finally, the basic operations of the process that has been described above are condensed in the flow chart that forms the single figure of the drawing.

As seen in the figure, there is first generated an i.i.d. random number stream by any of the techniques known for such purpose. This stream is then transformed to a sequence of correlated uniform variates by TES methods involving a modulo 1 autoregressive scheme, as described. Then this sequence typically is transformed in known fashion to a sequence of variates with a desired marginal distribution. The resulting sequence is then used as a queueing model in traffic studies in the usual fashion.

While the invention has been described with specific reference to providing a sequence of variates with desired marginal distribution and correlations for traffic studies, it should be evident that the basic principles should be applicable to providing such a sequence for comparable use in other applications.

What is claimed is:

1. A computer-implemented method for testing a model of a communications system by applying a simulated traffic pattern having a desired correlation and detecting a response to such application, the method comprises the steps:

producing a sequence of independent identically-distributed variable signal values of uniform marginals and choosing therefrom first and second independent signal values, constructing from said second chosen signal value an innovation signal value having a prescribed marginal distribution in an interval of signal values chosen appropriately to achieve a desired correlation in the simulated traffic pattern, combining the first chosen signal value and the innovation signal value in a modulo-one addition and recovering the fractional value of the addition as a variate in a sequence of autocorrelated signal values, constructing a new innovation signal value having the prescribed marginal distribution from a new independent variable signal value chosen from the sequence of identically-distributed variable signal values, combining the new innovation signal value in a new modulo-one addition with the recovered fractional value of the previous modulo-one addition and recovering the fractional value of such addition as a subsequent variate in the sequence of autocorrelated signal values, repeating in recursive fashion the choosing, constructing, combining and recovering steps to form succeeding variates of the sequence of autocorrelated signal values, applying the sequence of autocorrelated signal values for simulating the traffic patterns to the model of the communications system to be tested, and detecting the output response of the model to said applied sequence for ascertaining the real-time performance that can be anticipated of the communication system under the traffic pattern being simulated.

2. The computer-implemented method of claim 1 in which a random number generator produces the initial sequence of independent identically-distributed variable signal values.

3. The computer-implemented method of claim 1 further comprising the step, occurring before the applying step, of modifying by a distortion operation the variates of the sequence of autocorrelated signal values recovered from the modulo-one additions to obtain a desired marginal distribution.

* * * * *

UNITED STATES PATENT AND TRADEMARK OFFICE
CERTIFICATE OF CORRECTION

PATENT NO. : 5,257,364

DATED : October 26, 1993

INVENTOR(S) : Benjamin Melamed and David Jagerman

It is certified that error appears in the above-indentified patent and that said Letters Patent is hereby corrected as shown below:

On the title page, item (75) Inventors, change the city, from "Crawford" to -- Cranford - -.

Signed and Sealed this

Fifth Day of April, 1994

Attest:

BRUCE LEHMAN

*Attesting Officer*  *Commissioner of Patents and Trademarks*